United States Patent [19]

Ellingboe et al.

[11] 4,076,930
[45] Feb. 28, 1978

[54] POLYSACCHARIDE POLYOLS

[76] Inventors: James Ellingboe, 35 Hollis St., South Weymouth, Mass.; Ernst Holger Nystrom, Skoldvagen 21, 182 64 Djursholm; Jan Bertil Sjövall, Nybrogaten 23, 114 39 Stockholm, both of Sweden

[21] Appl. No.: 110,931

[22] Filed: Jan. 29, 1971

Related U.S. Application Data

[63] Continuation-in-part of Ser. No. 783,736, Dec. 13, 1968, abandoned.

[51] Int. Cl.$^2$ .................. C08B 11/08; C08B 31/08; C08B 37/00
[52] U.S. Cl. ..................................... 536/1; 536/3; 536/4; 536/20; 536/84; 536/107; 536/111; 536/112; 536/114; 536/120; 210/24; 210/65; 210/198 C
[58] Field of Search ........ 260/209 R, 212 R, 233.3 R; 536/20, 84, 111, 1, 120, 112, 3, 4

[56] References Cited

U.S. PATENT DOCUMENTS

| | | | |
|---|---|---|---|
| 2,902,478 | 9/1959 | Anderson | 260/209 |
| 2,996,551 | 8/1961 | DeGroote et al. | 260/209 |
| 3,170,915 | 2/1965 | Gaertner | 260/209 |
| 3,277,025 | 10/1966 | Flodin et al. | 260/209 |
| 3,277,076 | 10/1966 | Kobe | 260/209 |
| 3,300,474 | 1/1967 | Flodin et al. | 260/209 |
| 3,314,936 | 4/1967 | Ames | 260/209 |
| 3,402,169 | 9/1968 | Jackson | 260/209 |
| 3,449,318 | 6/1969 | Roth et al. | 260/209 R |
| 3,510,471 | 5/1970 | Case | 260/209 R |
| 3,542,759 | 11/1970 | Gelotte et al. | 260/212 |
| 3,721,665 | 3/1973 | Moss et al. | 260/233.3 R |
| 3,723,408 | 3/1973 | Nordgren et al. | 260/209 R |
| 3,726,855 | 4/1973 | Lapkin | 260/209 R |
| 3,737,426 | 6/1973 | Throckmorton et al. | 260/209 R |

*Primary Examiner*—Johnnie R. Brown
*Attorney, Agent, or Firm*—Leydig, Voit, Osann, Mayer & Holt, Ltd.

[57] ABSTRACT

Hydroxyalkyl ethers of hydroxyalkoxy polysaccharides are prepared by reacting the corresponding polysaccharide first with an epoxide in an aqueous alkaline medium, and then with an epoxide in the presence of a Lewis acid catalyst in a nonaqueous, nonalcoholic organic solvent. The resulting products are hydrophobic and strongly lipophilic, and are outstanding substrates for liquid-gel chromatography.

4 Claims, 3 Drawing Figures

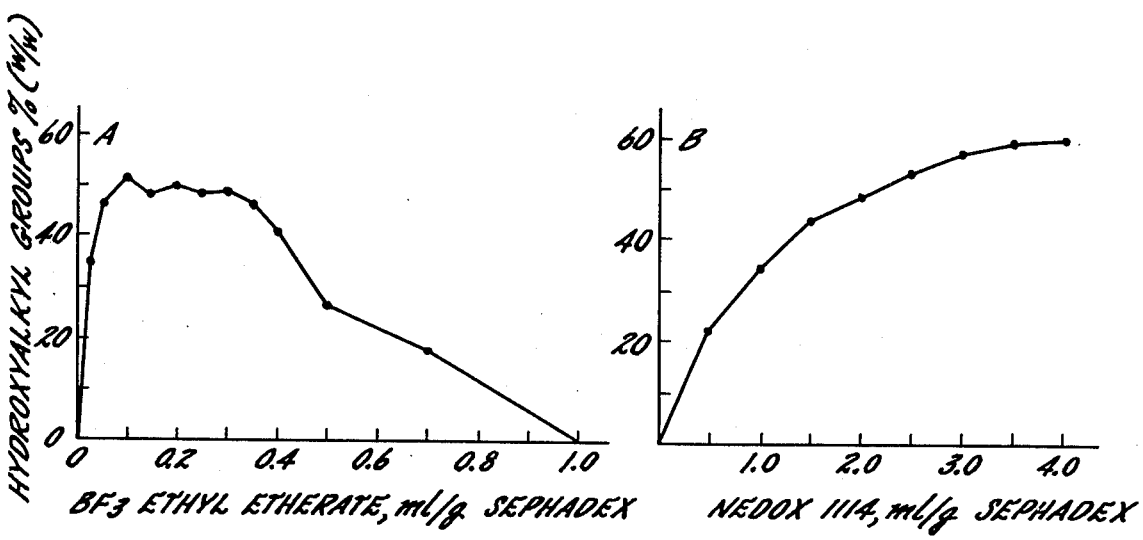
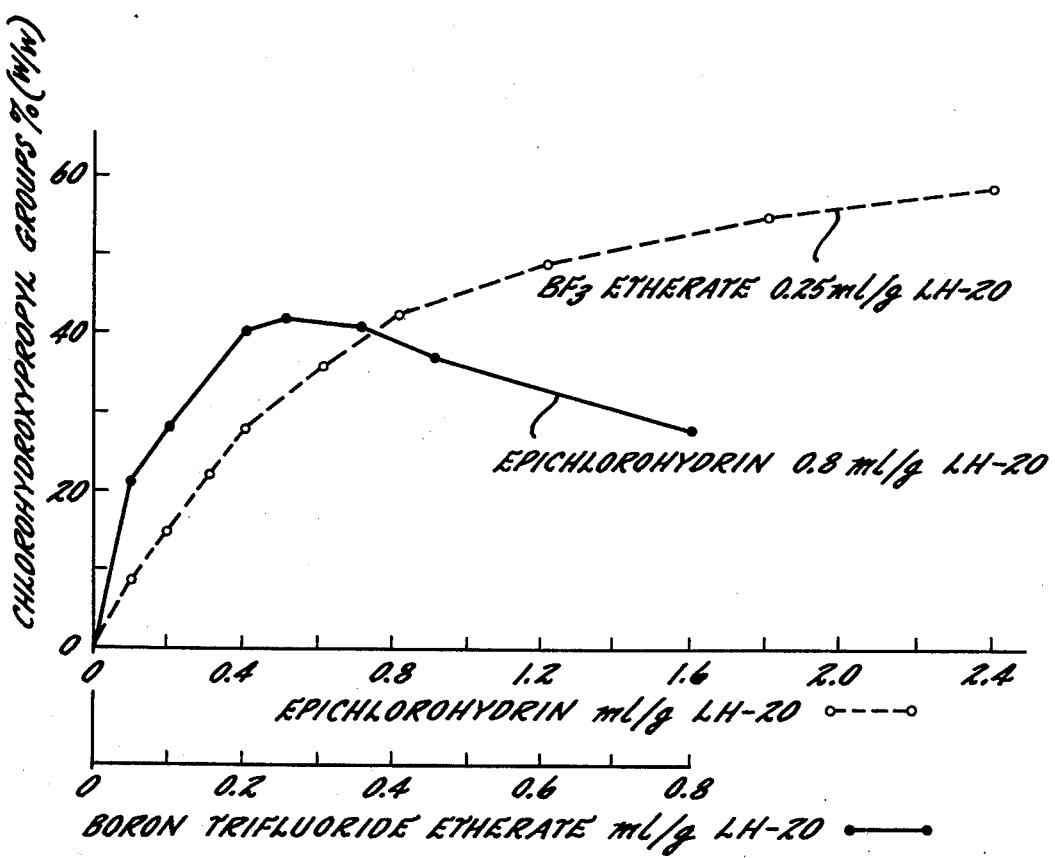

POLYSACCHARIDE POLYOLS

CROSS-REFERENCE TO RELATED APPLICATIONS

This is a continuation-in-part of our application Ser. No. 783,736, filed December 13, 1968, now abandoned.

BACKGROUND OF THE INVENTION

This invention relates to novel polysaccharide derivatives and to their method of production. More particularly, it concerns the preparation of new polysaccharide derivatives that are hydrophobic and strongly lipophilic, and which consequently are outstanding substrates for liquid-gel chromatography.

In the technique of liquid-gel chromatography, mixtures of lipids, steroids, enzymes, or like biological materials are resolved by selective elution through a column packed with an immobile substrate, or stationary phase, composed of an insoluble polymer having functional groups. Separation of the mixture components is effected by the greater or lesser degree of attraction between the individual component and the functional groups on the substrate.

Because of the variety of biological mixtures likely to be encountered, and because of the different eluting solvent systems employed, it is necessary to provide substrates which are unaffected by water (hydrophobic) yet are solvated by organic solvents and have a relatively strong affinity for the organic biologicals (lipophilic). Additionally, it is desirable to provide a substrate which can be modified for specific separations by substitution with various functional groups.

Attempts have been made to produce hydrophobic and strongly lipophilic substrates from polysaccharides, especially from cellulose and dextran. By known procedures it is possible to produce some types of derivatives, e.g. esters, but for many applications the physical characteristics and the greater chemical stability of the ether derivatives are desirable or necessary. Although polysaccharides combine readily with short-chain epoxides in alkali-catalyzed reactions to produce weakly lipophilic ether-substituted derivatives, these products are not well solvated by the very nonpolar solvents (e.g. heptane) and do not possess hydrophobic properties. Longer chain epoxides have not been found to react readily with the hydroxyl groups of polysaccharides under alkaline conditions. This lack of reactivity is due primarily to the greatly differing solvation characteristics of the polysaccharide and the epoxide, thus considerably limiting the amounts of catalyst and reagents participating in the actual reaction. Additionally, hydrogen bonding within the polysaccharide matrix prevents solvation and interaction with most acidic catalysts and organic reaction media.

Therefore, until now it has been difficult or impossible with known methods to produce hydrophobic, strongly lipophilic, products containing stable ether linkages from polysaccharide materials.

SUMMARY OF THE INVENTION

Briefly, in accordance with the invention, novel hydroxyalkyl ethers of hydroxyalkoxy polysaccharides are prepared as hydrophobic-lipophilic materials in two reaction steps. First, a polysacharide is hydroxyalkoxylated by reaction with an epoxide to form the hydroxyalkoxy polysaccharide, in an aqueous system with an alkaline catalyst. Then the product of the first step is reacted with an epoxide to form the hydroxyalkyl ether in a nonaqueous nonalcoholic organic solvent with a Lewis acid catalyst.

The products of the invention may, if desired, be further modified by reaction at the residual free hydroxyl groups. Further modification may alternately or concurrently be effected by utilizing as the epoxide in either the first or the second epoxidation, a bi-functional epoxide.

By way of illustration, a typical reaction sequence is presented below with respect to the use of simple epoxides for both steps. It will, of course, be appreciated that the original polysaccharide has several hydroxyl groups, and accordingly all or less than all of the groups may be reacted according to the process of the invention.

Although epoxides are preferred by reason of availability, for some purposes episulfides may be employed and if so are used in analogous manner.

| Example | Polysaccharide | First Epoxide | Second Epoxide |
|---|---|---|---|
| 1 | Sephadex G-50 base | propylene oxide | Neodex 1518 (15–18 C atoms) |
| 12 | Sephadex G-50 base | propylene oxides | Neodex 1114 (11–14 C atoms) |
| 3 | Sephadex LH-20 base | propylene oxides (?) | Neodex 1114 |
| 4 | Sephadex LH-20 base | propylene oxides (?) | Neodex 1114 + phenylethylene oxide |
| 5 | Cellulose | propylene oxides + epichlorohydrin | Neodex 1114 |
| 6 | Cellulose | propylene oxides + epichlorohydrin | Neodex 1114 |
| 7 | Cellulose | propylene oxides + epichlorohydrin | Neodex 1114 |
| 8 | Cellulose | propylene oxides | propylene oxide |
| 10 | Sephadex G-50 base | propylene oxide | epichlorohydrin |
| 10 | Sephadex LH-20 base | propylene oxide (?) | epichlorohydrin |
| 11 | Cellulose | epichlorohydrin + epoxypropane | epichlorohydrin |
| 12 | Sephadex G-50 base | propylene oxide | epibromohydrin |
| 13 | Sephadex LH-20 base | propylene oxide (?) | epibromohydrin |
| 14 | Sephadex LH-20 base | propylene oxide (?) | epichlorohydrin, Neodex 1114 |
| 18 | Sephadex LH-20 base | propylene oxide (?) | Neodex 1114, epichlorohydrin epichlorohydrin, Neodex 1114 |
| 19 | Sephadex LH-20 base | propylene oxide (?) | propylene sulfide |
| 20 | Sephadex LH-20 base | propylene oxide (?) | cyclohexene oxide |
| 21 | Cellulose | propylene oxide | phenylethylene oxide |
| 26 | Sephadex LH-20 base | propylene oxide (?) | epichlorohydrin |
| 27 | Cellulose | propylene oxide + epichlorohydrin | epichlorohydrin |
| 29 | Sephadex G-25 base | propylene oxide | Neodex 1114 |

| Example | Polysaccharide | First Epoxide | Second Epoxide |
|---|---|---|---|
| 29 | Sephadex LH-20 base | propylene oxide (?) | Neodex 1114 |

The products of the invention include polysaccharide derivatives having at least one radical of the formula

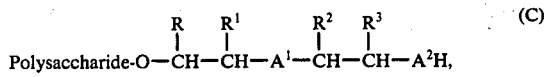

where the A's are oxygen and/or sulfur and where the R's are each hydrogen, and/or halogenated or non-halogenated hydrocarbons chosen from alkyl (including aralkyl and cycloalkyl), aryl (including alkaryl), and alkylene radicals. In the above formula, R and $R^1$, when they are hydrocarbons, contain from 1 to 6 carbon atoms, and $R^2$ and $R^3$, when hydrocarbons, contain from 1 to 30 carbon atoms.

Ordinarily, the A's are oxygen, which is derived from the epoxide used in both reaction steps. However, the corresponding episulfide may be used in analogous episulfidation reactions, particularly in the second step to provide $A^1 = O$ and $A^2 = S$.

It is preferred that R be hydrogen and $R^1$ be hydrocarbon, e.g. an alkyl such as methyl, because such groups are readily obtained by the alkaline catalyzed reaction with an alkyl substituted epoxide, e.g. propylene oxide. An additional preference is for $R^2$ or $R^3$ to be a halogenated alkyl such as halomethyl, which is afforded by the acid catalyzed reaction with an epihalhydrin. Halogens provide a functionality that may be availed of, e.g. by cross-linking with other free hydroxyl groups, or by a condensation or addition reaction.

Because of the favorable physical and chemical characteristics and the extended hydroxyl function of the hydroxyalkoxylated intermediate, a variety of reagents containing an epoxide group and preferably 2-20 carbon atoms can be reacted under conditions of acid catalysis in an inert solvent. The hydrocarbon radical which is thereby attached in an ether linkage confers upon the reaction product the desirable strongly lipophilic solvation characteristics.

Further descriptions of the present invention are to be found in a series of papers by Ellingboe and others (e.g. *J. Biochim Biophys. Acta* 142, (1968) 803; in Lowenstein, J. M., *Methods in Enzymology* 14, 317 (1969); *J. Lipid Res* 11, 266 (1970); *Acta Chem. Scand.* 24, 463 (1970).)

BRIEF DESCRIPTION OF THE DRAWINGS

The invention will be described further in conjunction with the annexed drawings wherein:

FIG. 1-*a* is a graph showing the effect on the degree of substitution of Sephadex LH-20$^R$ by the epoxide Nedox 1114$^R$ as a function of $BF_3$-ethyl etherate (48% $BF_3$) content of the reaction mixture (at constant 2.5 ml Nedox/g. Sephadex).

FIG. 1-*b* shows the effect on the degree of substitution as a function of the Nedox 1114$^R$ content of the above mixture (at constant 0.25 ml $BF_3$-etherate content/g. Sephadex), and FIG. 2 illustrates the relationship between the degree of chlorhydroxypropyl substitution and the amount of epichlorohydrin and boron trifluoride ethyl etherate used in reactions with Sephadex LH-20$^R$.

DETAILED DESCRIPTION OF THE INVENTION

As indicated above, the products of the invention are prepared by hydroxyalkylation of a polysaccharide in an aqueous alkaline medium, followed by hydroxyalkylation in an nonaqueous, nonalcoholic, acidic organic solvent medium. Detailed discussion of the reactions, reagents, and products appear below.

A. POLYSACCHARIDES

The polysaccharide starting material may be any of the polyhexoses or polypentoses having more than 3 simple sugar groups in the molecule.

The polysaccharide materials in this synthetic process may be any of a wide range of polysaccharides (i.e., starch, cellulose, agarose, dextrans, xylan, chitin, alginic acid, carrageenan, and their partially degraded, cross-linked, or otherwise modified derivatives). The polysaccharide material may be a natural product or a synthetic derivative such as the commercially manufactured cross-linked dextran, Sephadex$^R$, presumably made under a series of patents to A. B. Pharmacia (e.g. U.S. Pat. Nos. 3,300,474, 3,277,025). Because the characteristics of the monosaccharide subunits and the nature of their glucoside linkages to form polysaccharides have no bearing on the process of this invention, all polysaccharides are included within the scope of this invention as being analogous to the examples given.

B. EPOXIDES (FOR ALKALI CATALYZED HYDROXYALKYLATION)

For the initial preparation of the hydroxyalkoxy polysaccharide, an epoxide is reacted with the polysaccharide in an aqueous alkaline medium.

Suitable epoxides for this step are those which afford the desired R and $R^1$ groups in equation (C), above. Thus, for example, epoxide-containing compounds having from 2 to 8 carbon atoms may be employed, e.g. ethylene oxide, propylene oxide, butylene oxide, cyclohexene oxide, phenyl ethylene oxide, 1,2- epoxy -2,4,4-trimethylpentane, 3-methyl-3-4-epoxybutene, 3,4-epoxybutene, or other epoxides listed in Kirk-Othmer's "Encyclopedia of Chemical Technology", 2nd Ed., Vol. 8, p.p. 263-285.

In addition to, or in place of, the mono-epoxides of unsubstituted hydrocarbons, diepoxides may be employed for the first hydroxyalkylation. These include diepoxybutane, diepoxypropyl ether, ethylene glycol-bis-epoxypropyl ether, 1,4-butanediol-bis-epoxypropyl ether, etc.

Halogen substituted mono epoxides include the epihalohydrins, e.g. epichlorohydrin and epibromohydrin, and others listed in U.S. Pat. No. 3,402,169.

With the qualifications dictated by the desired end product, the above epoxides may be used in the subsequent acid-catalyzed epoxidation. Generally, short chain epoxides are best for the first step of the reaction sequence, by reason of their reactivity, while long chain epoxides react optimally in the second or acid catalyzed step to afford the desired lipophilic-hydrophobic characteristics for the product.

C. EPOXIDES (FOR ACID-CATALYZED EPOXIDATION)

Satisfactory epoxide group-containing reagents for the acid catalyzed synthetic process are organic compounds based on a hydrocarbon or halogenated hydrocarbon containing from 2 to 32 carbon atoms, which may possess an aliphatic, branchedchain, cyclic or aromatic structure and may be interrupted by ether groups and double bonds. Examples of such reagents are ethylene oxide, propylene oxide, epichlorohydrin, epibromohydrin, 1,2-hexadecene oxide, Nedox 1114$^R$ and Nedox 1518$^R$ (mixtures of olefin oxides containing primarily 11 to 14 and 15 to 18 carbon atoms respectively), phenylethylene oxide, 1,2-epoxy-2,4,4-trimethylpentane, etc. In addition to reaction with single species of epoxide group-containing compounds, it is possible by this method to use mixtures of epoxides and/or to submit the reaction product to subsequent similar reactions with the same or different epoxides (e.g. Nedox 1114$^R$ and phenylethylene oxide or Nedox 1114$^R$ and epichlorohydrin). The reactions have the feature that for every hydroxyl group substituted, a new hydroxyl group is generated, thus placing no limit on the number of reaction steps possible or the number of different types of epoxides used in the reactions.

When reagents containing at least two epoxide groups (e.g. diepoxybutane or diepoxypropyl ether) are included in various proportions in the reaction mixture, it is also possible to obtain products with an increased degree of cross-linking. The degree of cross-linking depends upon the concentration of bifunctional reagents, their nature, and the reaction conditions used (e.g. choice of solvent). This cross-linking may be carried out during the reaction in which specific derivatives are synthesized, or it may be performed in optional subsequent reactions.

D. PREPARATION OF HYDROXYALKOXY-POLYSACCHARIDES

To achieve polysaccharide substitution under the conditions described herein, a hydroxyalkoxy derivative of the polysaccharide is required for the subsequent acid catalyzed reaction. The most important reasons for choosing these (hydroxyalkyl ether) derivatives as starting materials (or intermediates) are: 1. good solvation properties with a wide variety of solvents, 2. possession of as many hydroxyl groups on an equivalent basis as the original polysaccharide, and 3. chemical stability. These characteristics permit the choice of reaction conditions which can be controlled so that any desired degree of substitution can be achieved. The hydroxyalkylated polysaccharide may be any of the above-mentioned polysaccharides which, by substitution, have been rendered somewhat lipophilic, so that is can be solvated by nonaqueous, nonalcoholic solvents.

When such hydroxyalkoxylated polysaccharide materials are available commercially they may be used directly in the subsequent acid catalyzed reaction. Among such commercial products are hydroxyethyl and hydroxypropyl cellulose and Sephadex LH-20$^R$, a hydroxypropyl derivative of a cross-linked dextran manufactured by A. B. Pharmacia, Uppsala, Sweden. Such modified polysaccharide materials can be produced by known methods, such as an aqueous-alkali catalyzed reaction with propylene oxide. In this reaction, reagents containing from 2 to 8 carbon atoms, preferably 2-4, and especially 3 carbon atoms are coupled to the polysaccharide material to give a weakly lipophilic derivative with the desired property of swelling in certain nonaqueous, nonalcoholic solvents. These starting materials (or intermediate) may be soluble or insoluble in the chosen reaction medium and they may also be reacted while in the form of films or while held within the cavities of a lattice such as porous glass or various cross-linked polymeric substances. When the products are intended for use in high resolution chromatography, it is desirable that the starting materials or the products be of particulate nature and preferably fractionated to a defined range of particle size.

E. PREPARATION OF HYDROXYALKYL ETHERS OF HYDROXYALKOXY POLYSACCHARIDES

To prepare the final hydroxyalkyl ether of the hydroxyalkoxy polysaccharide, the latter is reacted with an epoxide under nonaqueous, nonalcoholic conditions in the presence of an acid catalyst.

As a reaction medium, a suitable inert, nonaqueous, non-reactive solvent is required. The solvent should solvate (swell or dissolve) the weakly lipophilic hydroxyalkoxylated polysaccharide and dissolve the epoxy group-containing compounds. Such requirments may be met by ethers and by halogenated hydrocarbon solvents (e.g. dioxane, chloroform, methylene chloride, ethylene chloride, etc.) among others.

The reaction with epoxides is catalyzed by acids in general (i.e., sulfuric acid, perchloric acid, stannic chloride), but preferably by boron trifluoride, which permits reactions to occur under milder conditions at room temperature. Boron trifluoride, as described above, may be employed as the diethyl etherate, but may also be introduced into the solvent or reaction mixture as a gas or as another organic complex.

By varying the reaction conditions (i.e by changing the nature of the solvents, the reactants, the catalysts and their relative concentrations), products can be obtained with varied degrees of substitution, and thereby of varied degrees of lipophilicity or other special character. The degree of substitution can most easily be controlled by the amount of the epoxide used in the reaction.

In order to establish the stoichiometric relationships for controlled substitution, the reactions of epichlorohydrin and Nedox 1114$^R$ with hydroxypropyl derivatives of Sephadex LH-20$^R$ were investigated as a function of relative amounts of boron trifluoride ethyl etherate, epoxide and dextran derivative. FIGS. 1 and 2 show the results of these reactions which were conducted essentially as described in the examples below.

The effect of the amount of boron trifluoride etherate and the amount of Nedox 1114 ®on the degree of substitution of Sephadex LH-20 ®is illustrated in FIG. 1. The optimum amount of BF$_3$ ethyl etherate (BF$_3$48%) was determined using 2.5 ml of Nedox 114 ®per g of Sephadex LH-20 ®, curve A. When the volume of Nedox 1114 ®was varied, 0.25 ml of BF$_3$ethyl etherate per g of Sephadex LH-20 ®was used, curve B. The optimal amount of boron trifluoride ethyl etherate is 0.1 to 0.3 ml per g of hydroxypropyl Sephadex. The epoxide was most conveniently used as 10% solution in dry dichloromethane. By cooling with ice water, the reaction was kept below room temperature.

FIG. 2 illustrates the relationship between the degree of chlorohydroxypropyl substitution and the amount of epichlorohydrin and boron trifluoride ethyl etherate (48% BF$_3$) used in reactions with Sephadex LH-20 ®. When the amount of epichlorhydrin was varied, the amount of boron trifluoride was held constant at 0.25 ml per g of Sephadex LH-20 ®.

A constant amount of 0.8 ml epichlorohydrin per g Sephadex LH-20 ® was used when the amount of BF$_3$ varied. Complete substitution of all hydroxyl groups in Sephadex LH-20 ® corresponds to about 48% chlorohydroxypropyl group content. A similar study using epibromohydrin gave essentially the same degree of substitution as when epichlorohydrin was used.

F. PREPARATION OF ADDITIONAL DERIVATIVES

By a process analogous to that described under the preparation of strongly lipophilic derivatives, halogenated derivatives of polysaccharides may be prepared. Because of the potentially reactive halogen atoms, these materials are susceptible to further addition and substitution reactions resulting in products possessing specific properties of wide application, but most particular to separation processes.

Although any of a wide range of halogenated epoxides can be used in such substitution reactions, the most useful of these reagents are the epihalohydrins, especially epichlorohydrin and epibromohydrin. Methods are known whereby epihalohydrins can be reacted with polysaccharides; the established procedures occur, however, under alkaline conditions usually in aqueous or hydroxylic media, and result in cross-linking of the polysaccharide, polymerization, and/or consequent loss of the functional halogen groups. In the present process, however, the substitution of the polysaccharide is effected by acidic catalysis, i.e. under conditions in which only the epoxide function of an organic compound having an epoxide group and a halogen substituent will react with the polysaccharide; the halogen function remains unreacted for potential substition in subsequent optional steps wherein specific groups are introduced in place of the halogen atoms.

The intermediate prepared by reaction of a hydroxyalkylated polysaccharide with an epihalohydrin under acidic conditions is the halohydroxypropyl substituted derivative, which may be used in the production of a multitude of end products. This intermediate, produced by the process of this invention so that the halohydroxypropyl group is bound in ether linkage to the hydroxyalkoxy polysaccharide, is capable of addition and substitution reactions because of the reactive halide and hydroxyl groups. Under basic conditions, hydroxylic functions and halogens on adjacent carbons undergo reactions typical of epoxides, whereas under other conditions, reactions take place at only the hydroxyl or the halide function. This process may in some ways be compared with the process for chloromethylation of styrene-divinyl benzene copolymers which permits further halogen substitution reactions leading to the production of anion-exchange resins for chromatographic use. (See Pepper, K. W., Paisley, H. M. and Young, M. A., *J. Chem. Soc.* 1953, 4097).

Among the products which may be obtained from halohydroxyalkyl substituted polysaccharides are the primary, secondary, tertiary and quaternary amines, which may be prepared by reactions with ammonia or substituted amines. By such procedures, which are analogous to those used in the preparation of anion exchangers from chloromethylated polystyrene, it is possible to prepare a series of anion exchangers ranging from the weakly basic primary amines to the strongly basic quaternary amines. The derivatives containing primary amino groups also offer potential use as matrices to which enzymes, antigens and antibodies may be bound. (See Silman, I. and Katachalski, E., *Ann Rev. Biochem.* 34, 873 (1966); Axen R. and Porath, J., *Acta Chem. Scand.* 18, 2193 (1964); Axen, R. and Porath, J., *Nature* 210, 367 (1966); Axen, R., Porath, J., and Ernbach, S., *Nature* 214, 1302 (1967). By use of cyclohexylcarbodiimide or even the water-soluble carbodiimides, it is possible to attach carboxyl group-containing compounds to the amino-substituted polysaccharides via amide linkage. Other derivatives of aminopolysaccharides are the N,N-disubstituted products such as the N,N-diacetic acid derivatives which have chelating properties.

Halohydroxyalkylated polysaccharides may also be used to attach compounds in ester or ether linkage, by reaction with salts or carboxylic acids or with alcohols under anhydrous alkaline conditions.

The halogen atoms of halohydroxyalkylated polysaccharides may also be replaced by sulfydryl groups when treated with a solution of alkali hydrosulfide or when reacted with thiourea and subsequently hydrolyzed by base. These derivatives show a strong affinity for such heavy metals as mercury, in the form of salts or covalently bound organometallic compounds. Mercapto-cellulose, for example, can be used as a filter for industrial waste water containing alkyl or phenyl mercury compounds, or it can be used to concentrate such compounds from large volume of dilute solution so that quantitative analysis for mercury can then be performed. The bifunctional mercurial, 3,6-bis (acetate-mercurimethyl)-dioxane, used by Eldjarn and Jellum for the preparation of an organomercurial Sephadex is also strongly bound. (See Eldjarn, L. and Jellum, E., *Acta Chem. Scand.* 17, 2610 (1963).)

SPECIFIC EMBODIMENTS

The invention will be further described with reference to the following examples.

EXAMPLE 1

Hydroxypropyl Sephadex G-50 ® (10.0 g, superfine, bead form, prepared by addition of propylene oxide under aqueous alkaline conditions) was soaked in 150 ml of dry methylene chloride. Boron trifluoride ethyletherate (5 ml, 48% BF$_3$) was added and the mixture was stirred thoroughly. While stirring at room temperature, an alkyl olefin oxide (50 ml. Nedox 1518 ®, a C$_{15-18}$ chain length olefin oxide mixture available from Ashland Chemical Company, P.O. Box 2219, Columbus, Ohio 43216, USA) was added slowly so that the resulting exothermic reaction did not cause uncontrolled refluxing. Additional dry methylene chloride (ca. 100 ml) was required to facilitate stirring of the increasingly viscous mixture; then the mixture was stirred for 20 minutes at room temperature. The lipophilic Sephadex derivative was filtered free of solvent and washed consecutively with chloroform, ethanol, acetone and petroleum ether. The "end product" had gained in weight by 125% and was no longer wet by water. The following solvent regain factors (g solvent/g dry Sephadex derivative) were obtained in various solvents. Water 0.3, ethanol 0.4, acetone 0.4, methylene chloride 4.4, benzene 3.1, heptane 2.1.

EXAMPLE 2

Hydroxypropyl Sephadex G-50 ®(11.4 g, fine, bead form) was soaked in 150 ml of methylene chloride. Boron trifluoride ethyletherate (5 mls; 48% $BF_3$) was added and the mixture was mixed thoroughly. While stirring at room temperature, 50 ml of an alkyl olefin oxide (50 ml, Nedox 1114 ®, a $C_{11-14}$ chain length olefin oxide mixture) was added slowly. Additional dry methylene chloride (ca. 100 ml) was added, then the mixture was stirred for 20 minutes at room temperature. After filtering, washing with a sequence of organic solvents and drying, the "end product" had gained in weight 110%. Solvent regain factors: Water 0.5, ethanol 1.1, acetone 0.9, methylene chloride 6.6, benzene 4.4, heptane 2.5.

EXAMPLE 3

Sephadex LH-20 ®(20 g) was soaked in 100 ml of dry methylene chloride. Boron trifluoride ethyletherate (10 ml, 48% $BF_3$) was added and the mixture was stirred for 10 minutes. While stirring at room temperature, a solution containing 50 ml of Nedox 1114 ® olefin oxide and 50 ml of methylene chloride was slowly added. After the addition was complete, the mixture was stirred for 20 minutes at room temperature. The product was filtered free of solvent, washed with organic solvents and dried in vacuo. The "end product" had gained 100% in weight. Solvent regain factors: Water 0.4, ethanol 0.7, acetone 0.6, methylene chloride 2.3, benzene 1.5, heptane 0.8.

EXAMPLE 4

A lipophilic-hydrophobic derivative of Sephadex containing both alkyl and aromatic substituents was made by the following procedure. Sephadex LH-20R (20 g) was soaked in 100 ml of dry dichloromethane. Boron trifluoride ethyletherate (10 ml, 48% $BF_3$) was added and the mixture was stirred for 10 minutes. While stirring at room temperature, a solution containing 50 ml of Nedox 1114 ® olefin oxide and 50 ml dichloromethane was slowly added. After the addition was complete, the mixture was stirred for 20 minutes at room temperature. The product was filtered free of solvent, washed with chloroform and ethanol, then dried. The product had gained 100% in weight.

The above product (40 g) was suspended in 200 ml dichloromethane, boron trifluoride ethyletherate (8 ml, 48% $BF_3$) was added and the mixture was stirred for 10 minutes. While stirring at room temperature a solution of phenylethylene oxide (80 ml in 80 ml dichloromethane) was added slowly with mixing. After addition of the epoxide, the mixture was stirred for 20 minutes at room temperature then filtered free of solvent and washed with chloroform, ethanol, acetone and petroleum ether. The product was dried in vacuo to a constant weight. The increase in weight was 9.4 g (19% phenylhydroxyethyl groups by weight).

EXAMPLE 5

Cellulose (100.0 g), type Whatman CF 11, was soaked in 1000 ml 30% NaOH. After one hour the excess of sodium hydroxide was filtered off by using a Buchner funnel equipped with a fine-mesh polyethylene net. The cellulose pulp, weighing 489.0 g, was suspended in 2000 ml propylene oxide and 400 ml epichlorohydrin in a round-bottomed flask having a condenser and a stirrer. The mixture was stirred thoroughly while refluxing for one hour, whereupon 800 ml ethylene chloride were added, and the refluxing continued over night with stirring. The product was filtered free from solvents and was washed with ethanol, water, ethanol and chloroform, and was dried in an oven to a constant weight of 190.3 g. 10.0 g of this product were suspended in 100 ml of dioxane in a 500 ml round-bottomed flask equipped with a magnetic stirrer and a condenser. 5.0 ml of boron trifluoride ethyletherate were than added. After 30 min. 25 ml Nedox 1114 were added, and the mixture was refluxed for about 1.5 hours with stirring. The product was filtered free from solvents and was washed with chloroform, ethanol, chloroform and ether. After drying, the weight was 12.1 g.

EXAMPLE 6

The experiment was performed essentially as described in Example 5. Methylene chloride (100 ml), was, however, used instead of dioxane in a reaction catalyzed by 1.0 ml of boron trifluoride ethyletherate. The product (14.3 g) could not be wetted by water.

EXAMPLE 7

The experiment was performed as described in Example 5. Ethylene chloride (100 ml) was, however, used instead of dioxane in the boron trifluoride-catalyzed reaction. The product (11.2 g) was not wetted by water.

EXAMPLE 8

The alkali-catalyzed reaction was performed as described in Example 5. 10 g of this material were suspended in 100 ml methylene chloride, after which 5.0 ml boron trifluoride ethyletherate (48% $BF_3$) were added. After 30 min. a mixture of 10 ml propylene oxide and 40 ml methylene chloride was added in portions. After 12 hours the product was filtered, washed in ethanol and chloroform and dried in an oven. The dried product had a weight of 14.3 g and was wetted by water.

EXAMPLE 9

This experiment was performed to prove the necessity for hydroxypropylation of the cellulose prior to the boron trifluoridecatalyzed reaction.

Cellulose (10.0 g), type Whatman CF 11, was suspended in 100 ml of methylene chloride, 5.0 ml of boron trifluoride ethyletherate were added, and the stirring was continued for 5 min. A mixture of 25 ml of Nedox 1114 and 25 ml methylene chloride was added in small portions. After 12 hours the cellulose was filtered free from solvents and washed with chloroform, ethanol and chloroform. The product (8.9 g) was wetted by water, and appeared identical to the starting material.

EXAMPLE 10

Chlorohydroxypropoxypropyl Sephadex ®

Hydroxypropylated Sephadex G-50 ®, 10.0 g, (superfine, bead form, prepared by addition of propylene oxide under aqueous alkaline conditions as described by Ellingboe, J., Nystrom, E. and Sjovall, J., *Biochim. Biophys. Acta*, 152, 803 (1968).) was soaked in 150 ml of dry dichloromethane. Boron trifluoride ethyl etherate, 1 ml (48% $BF_3$) was added and the mixture was stirred thoroughly for 10 minutes. While stirring at room temperature, epichlorohydrin, 3.6 ml, was added slowly as a solution in 40 ml dry dichloromethane. After addition of the epoxide, the mixture was stirred for 20 minutes at room temperature, filtered free of solvent, washed with chloroform followed by ethanol, then dried at 40° C to a constant weight. The chlorohydroxypropyl content, as determined by weight and checked by Cl determination was 7.1%. This product swelled in water, ethanol and chloroform.

In another experiment Sephadex LH-20 (170-240 mesh) 98.1 g, was soaked in 360 ml of dry dichloromethane. Boron trifluoride ethyl etherate, 25 ml, (48% $BF_3$) was added and the mixture was stirred thoroughly for 15 minutes. While stirring at room temperature, epichlorohydrin, 30.0 ml, was added slowly as a solution in 50 ml dry dichloromethane. After addition of the epoxide, the mixture was stirred for 40 minutes at room temperature, filtered free of solvent, washed with chloroform followed by ethanol, then dried at 40° C to a constant weight. The chlorohydroxypropyl content, as determined by weight and checked with chlorine determination was 22.9%. This product swelled in ethanol, chloroform and benzene, but not in water and heptane.

EXAMPLE 11

Chlorohydroxypropoxypropyl cellulose

A sheet of filter paper weighing 49.09 was cut into small pieces and soaked for 2 hours in 500 ml of 10% aq. sodium hydroxide. The excess aqueous phase was removed by suction and the wet alkaline paper pulp was hydroxypropylated and cross-linked by refluxing and stirring at 80° C for 6 hours with a mixture of 400 ml dichloroethane, 200 ml epichlorohydrin and 1 liter technical grade epoxypropane. The cellulose derivative was filtered free of solvents, washed with ethanol, water, and again with ethanol, then dried at 60° C. The product contained 28% hydroxpropyl groups by weight. A portion (28.1 g) of this product was soaked in 200 ml dichloromethane. A solution of 40 ml boron trifluoride ethyl etherate (48% $BF_3$) in 150 ml of dichloromethane was slowly added with stirring. After 30 minutes a mixture of 50 ml epichlorohydrin and 100 ml dichloromethane was slowly added. After this addition was completed, the mixture was stirred for 25 minutes, filtered free of solvents, washed with ethanol, water, and again with ethanol, then dried at 40° C. The product contained 14.3% chlorohydroxypropyl groups by weight.

EXAMPLE 12

Bromohydroxypropoxypropyl Sephadex G-50

Hydroxypropyl Sephadex G-50 (100% eq/eq substitution with hydroxypropyl groups), 5.0 g, was swelled in 75 ml methylene chloride for 10 minutes. Boron trifluoride ethyl etherate (48% $BF_3$), 0.5 ml, was added slowly with stirring. Soon thereafter 2.6 ml epibromohydrin in 25 ml of methylene chloride was slowly added with stirring. The mixture was stirred for a further 20 minutes after all the epibromohydrin had been added, then the product was filtered free of solvent and washed consecutively with chloroform, ethanol, water, ethanol and acetone. The dried product contained approximately 11% g/g bromohydroxypropyl groups as determined by weight, and 9-12% bromohydroxypropyl group content as calculated on a weight basis from a quantitative bromine analysis.

EXAMPLE 13

Bromohydroxypropyl Sephadex LH-20

Sephadex LH-20, 10.01 g, was swelled in 28 ml methylene chloride for 30 minutes prior to adding 2.5 ml of boron trifluoride ethyl etherate (48% $BF_3$) dropwise with stirring. After 15 minutes of continued stirring 3.1 ml of epibromohydrin was slowly added and stirring was continued for one hour after the epoxide addition was complete. The product was filtered free of solvent, washed with ethanol and chloroform and dried to a constant weight of 14.15 g. This weight increase corresponds to 29.2% g/g bromohydroxypropyl substitution. A quantitative bromine determination revealed that the product contained 18.7% g/g Br. The product did not swell in water or cyclohexane, but was swelled in ethanol, ethylene chloride and chloroform.

EXAMPLE 14

This example illustrates the second of two consecutive acid catalyzed hydroxyalkylations, the first reacting epoxide being epichlorohydrin and the second being Nedox 1114 ®.

Chlorohydroxypropyl (27.8% g/g) Sephadex LH-20, 10.15 g was swelled for 30 minutes in 30 ml of methylene chloride. Boron trifluoride ethyl etherate (48% $BF_3$), 2.6 ml, was added slowly with stirring during 15 minutes. Nedox 1114, 8.0 ml with 25 ml methylene chloride, was added dropwise at room temperature; the mixture was then stirred for 30 minutes, filtered free of solvent and washed with ethanol and methylene chloride. After drying to constant weight at 40°-50° C, the product had gained 2.93 g, corresponding to 22.4% long-chain hydroxyalkyl groups by weight.

EXAMPLE 15

This example illustrates the preparation of a tertiary amine ion exchanger from a Sephadex LH-20 derivative which had been formed by an initial acid catalyzed reaction with epichlorohydrin followed by a reaction with Nedox 1114.

The product of Example 14, 11.01 g, was swelled in 59 ml of dibutylamine, then 2.12 g potassium hydroxide dissolved in 88 ml of methanol were stirred in. The mixture was shaken for 3 hours at 55° C, then filtered and washed consecutively with ethanol, water, ethanol and finally methanol. The product was dried to a constant weight of 11.90 g, corresponding to 6.8% g/g substitution with dibutylamine groups. Titration of the chloride form with 0.1 M KOH in methanol indicated 0.85 meq/g substitution.

EXAMPLE 16

This example illustrates the second of two consecutive acid catalyzed hydroxyalkylations, the first reacting epoxide being Nedox 1114 and the second being epichlorohydrin.

Sephadex LH-20$^R$ was reacted with Nedox 1114$^R$ as described elsewhere so that the product contained 55% g/g long chain hydroxyalkyl groups.

For the second reaction 9.75 g of this product was swelled in 35 ml of methylene chloride and stirred for 10 minutes with 2.1 ml boron trifluoride ethyl etherate (48% $BF_3$). A solution of 3 ml epichlorohydrin and 15 ml methylene chloride was added slowly with stirring during 20 minutes then stirred for an additional 75 minutes. The product was filtered free of solvent, washed with ethanol and chloroform, then dried to a constant weight of 11.20 g, representing 12.9% g/g substitution by chlorohydroxypropyl groups.

EXAMPLE 17

This example illustrates the preparation of a strongly lipophilic tertiary anion exchanger from a Sephadex LH-20 derivative which had been formed by an initial acid catalyzed reaction with Nedox 1114 followed by chlorohydroxypropylation.

Exactly 10.00 g of the product of Example 16 was swelled for 15 minutes in 60 ml of dibutylamine. A solution of 2.12 g KOH in 90 ml methanol was added and shaken for 3 hours at 50° C, then shaken for 12 hours at 20° C before filtering and washing consecutively with ethanol, ethanol/acetic acid, ethanol/water, ethanol, and finally chloroform. The product was dried to a constant weight of 10.82 g, corresponding to 7.6% g/g substitution with dibutylamine groups.

EXAMPLE 18

This example illustrates a sequence of acid-catalyzed reactions leading to the production of alipophilic tertiary amine anion exchanger.

Sephadex LH-20 53.8 g, was swelled in 160 ml methylene chloride at room temperature for 30 minutes. Boron trifluoride ethyl etherate (48% $BF_3$), 12.5 ml, was added slowly with stirring, then stirred for 30 minutes more at room temperature. A solution of 25.0 ml Nedox 1114 ® and 60 ml methylene chloride was stirred in slowly, maintaining the mixture at room temperature, then stirring for an additional 30 minutes thereafter. The product was filtered free of solvent, washed with ethanol, chloroform, dried to a constant weight of 68.8 grams, representing 22.0% g/g substitution.

The above product, 68.7 g, was swelled in 225 ml of methylene chloride for 30 minutes at room temperature. Boron trifluoride ethyl etherate (48% $BF_3$), 15.0 ml, was added slowly with stirring. Stirring was continued for 30 minutes, then a solution of 25 ml epichlorohydrin and 40 ml methylene chloride were slowly stirred in. An additional 50 ml of methylene chloride was added and stirring was continued for 30 minutes. The product was filtered free of solvents and washed with ethanol, chloroform, then dried to a constant weight of 90.2 g, which corresponded to 23.8% g/g substitution with chlorohydroxypropyl groups.

The above product, 30.10 g, was swelled for 15 minutes in 160 ml of dibutylamine, then 5.78 g of KOH dissolved in 240 ml methanol were added. The mixture was shaken at 60° C for 4 hours, then filtered free of solvent and washed consecutively with ethanol, ethanol/acetic acid, ethanol/water, ethanol and finally chloroform. The dried product contained 11.5% g/g dibutyl amine substituents. By titration the degree of substitution was determinable to be 1.6 meq/g.

EXAMPLE 19

Thiopropyl Sephadex LH-20

This example illustrates the process of this invention applied to an analogous reaction using a cyclic sulfide rather than an epoxide.

Sephadex LH-20, 6.23 g, was swelled in 24 ml methylene chloride for 5 minutes then 2.5 ml of boron trifluoride ethyl etherate (48% $BF_3$) was added and stirred in for 5 minutes. A solution of 2.5 ml propylene sulphide in 5 ml methylene chloride was added with stirring. Stirring was continued for 20 minutes then the product was filtered free of solvent and washed consecutively with chloroform, ethanol, water, ethanol, and chloroform. The dried product at constant weight contained 5.0% thiopropyl groups. Phenyl mercury was strongly bound to the product and a quantitative sulfur determination showed 23 meq S per g of material.

EXAMPLE 20

Hydroxycyclohexoxypropyl Sephadex ®

Sephadex LH-20, 3.97 g, was swelled in 12 ml of methylene chloride for 10 minutes. Boron trifluoride ethyl etherate (48% $BF_3$), 1.0 ml, was added with stirring at room temperature. Cyclohexene oxide, 5.0 ml, and 8 ml of methylene chloride were mixed and then added slowly to the reaction mixture with stirring. After addition of the epoxide, the mixture was stirred for one hour, then filtered free of solvents and washed with ethanol and chloroform. The product was dried to a constant weight of 5.50 g, corresponding to 27.8% g/g substitution by hydroxycyclohexyl groups.

EXAMPLE 21

Phenylhydroxyethoxypropyl cellulose

A partially hydroxypropylated cellulose, 5.06 g, was swelled in 18 ml methylene chloride and stirred for 3 hours before adding 0.5 ml of boron trifluoride ethyl etherate (48% $BF_3$). Stirring was continued for 0.5 hour, then 5.0 ml of phenylethylene oxide in 20 ml of methylene chloride was slowly added over 0.5 hour with stirring. After a further 0.5 hour of stirring, the product was filtered and washed with chloroform, ethanol and chloroform. At constant weight the product weighed 6.5 g, corresponding to 22.2% g/g phenylhydroxyethyl group content.

EXAMPLE 22

Aminohydroxypropoxypropyl Sephadex was prepared by first swelling 4.0 g of 10.9% chlorohydroxypropylated Sephadex LH 20 for 5 minutes in 40 ml dioxane, then adding 60 ml concentrated aq. ammonia and shaking for 60 hours at room temperature. The product was collected on a filter, washed with water and ethanol, then dried at 40° C. A test with ninhydrin in 95% ethanol gave a positive reaction for amino groups and nitrogen analysis showed 8.5 µg N/mg product.

EXAMPLE 23

Aminoethoxyhydroxypropoxypropyl Sephadex was prepared by first swelling 3.81 g of 9.0% chlorohydroxypropylated hydroxypropyl Sephadex G-50 in 30 ml dioxane, then shaking for 22 hours at room temperature with a mixture of 0.7 g potassium hydroxide in 30 ml ethanolamine. The product was collected on a filter and washed with water and ethanol. A test was ninhydrin in 95% ethanol was positive and nitrogen determinations gave 12.1 µg N/mg product. This corresponds to a conversion of about 90% of the chlorohydroxypropyl groups into the amino erivative.

EXAMPLE 24

N-Hydroxyethylaminohydroxypropoxypropyl Sephadex was prepared by first swelling 12.6 g of 4.8% chlorohydroxypropylated hydroxypropyl Sephadex G-50 in 250 ml of dioxane, then shaking for 15 hours with 250 ml ethanolamine. The product was collected on a filter and washed with water and ethanol, then dried in vacuo. Testing with ninhydrin in 95% ethanol was negative, indicating the absence of free amino groups; nitrogen content was 1.9 μg N/mg product. This corresponds to a conversion of about 30% of the chlorohydroxypropyl groups into the hydroxyethylamino derivative.

EXAMPLE 25

Lithocholamidohydroxypropoxypropyl Sephadex

By the same procedures described in the preceding examples, Sephadex LH-20 was chlorohydroxypropylated to 8.1% on a weight basis and then treated with concentrated aq. ammonia in dioxane to produce an amino derivative containing 5.5 μg N/mg product. Lithocholic acid was attached in amide linkage by adding a solution of 3.76 g lithocholic acid in 50 ml dry dichloromethane to 4.16 g of the dry amino-Sephadex derivative and then shaking for 70 hours at room temperature with 3.0 g dicyclohexycarbodiimide. The reaction product was collected on a filter and washed with dichloromethane, ethanol, 10% ethanolic-acetic acid, water, ethanol, acetone and then dried to constant weight in vacuo. The increase of weight was 0.79 g, indicating full substitution of amino groups with lithocholic acid. The ninhydrin test was negative.

EXAMPLE 26

The commercial hydroxypropyl dextran product, Sephadex LH-20 ® was chlorohydroxypropylated and converted to the sulfhydryderivative by the following procedure. Sephadex LH-20 ® (200.0 g) was soaked in 800 ml of dichloromethane, stirred for 5 minutes, then 80 ml of boron trifluoride ethyletherate (48% $BF_3$) was added and stirred in for 10 minutes. Epichlorohydrin (25 ml in 400 ml dichloromethane) was added slowly with stirring and after this addition was complete, the mixture was stirred for 20 minutes at room temperature. The product was filtered free of solvents, washed with ethanol, water, and again with ethanol, and dried at 45° C to constant weight. The product contained 10.5% Chlorohydroxypropyl groups by weight.

Sulfhydryl group-containing Sephadex was prepared by heating 30 g of the above product with a solution of 10 g sodium hydrosulfide (NaHS), 100 ml absolute ethanol and 200 ml ethylene glycol for two hours at 100° C. The product was washed with water and ethanol and was dried at 40° C. The sulfur content was 14.3 μg/mg. To test for the capacity of this gel to filter mercury from solution, a 2 g column measuring 65 mm × 13 mm diameter was prepared. At a flow rate of 0.25 ml per minute, a total volume of 49.41 of an aqueous solution containing 4.25 mg phenyl mercuric hydroxide per liter was filtered before any mercury appeared in the eluant fractions.

EXAMPLE 27

Filter paper (49.0 g) was soaked for 2 hours in 500 ml of 10% aqueous sodium hydroxide. The excess aqueous phase was removed by suction and the wet alkaline paper pulp was hydroxypropylated and cross-linked by refluxing and stirring at 80° C for 6 hours with a mixture of 400 ml of ethylene chloride, 200 ml epichlorohydrin and 1 liter technical grade propylene oxide. The cellulose derivative was filtered free of solvents, washed with ethanol, water, and again with ethanol, then dried at 60° C. The product contained 28% hydroxypropyl groups by weight.

A portion (28.10 g) of the product described above was soaked in 200 ml dichloromethane and a mixture of 40 ml boron trifluoride ethyletherate (48% $BF_3$) and 150 ml epichlorohydrin, and 100 ml dichloromethane were slowly added. After this addition was completed, the mixture was stirred for 25 minutes, filtered free of solvents, washed with ethanol, water, and again with ethanol, and dried at 40° C. The product contained 14.3% chlorohydroxypropyl groups by weight.

The chlorohydroxypropyl cellulose product synthesized according to the above description was converted to a sulfhydryl derivative by heating 32.8 g with a mixture of 10 g sodium hydrosulfide (NaHS), 200 ml ethylene glycol and 100 ml absolute ethanol at 110° C for three hours. The product was washed with ethanol and water, then dried in the oven at 40° C. Essentially no chlorine remained bound in the cellulose derivative after this reaction and the sulfur content was determined to be 9.3 μg/mg. The product had a strong affinity for organic mercury compounds as demonstrated by its ability to filter mercuric acetate and phenyl mercuric hydroxide from dilute aqueous solutions and its ability to concentrate these compounds when shaken with them in dilute solutions.

EXAMPLE 28

Twenty grams of 10.5% clorohydroxypropylated Sephadex LH-20 ® (prepared as described in Example 7) were allowed to swell in 100 ml dioxane and were then heated on a steam bath for 8 hours with 200 ml 10% aqueous thiourea. The product of this reaction was washed with water and ethanol and was then hydrolyzed at room temperature by shaking with 200 ml of 10% aqueous sodium hydroxide. The product was washed with water, ethanol and low-boiling petroleum ether, then dried at 40° C. The sulfur content was 8.1 μg/mg.

EXAMPLE 29

To test the usefulness of the lipophilic-hydrophobic polysaccharide derivatives in separations of mixtures of different substances the following experiments were made.

Hydroxypropyl Sephadex G-25 in bead form, which had been reacted with Nedox 1114 to give a degree of substitution of 34 weight percent of hydroxyalkoxy chains was used for the preparation of a chromatography column. The derivative was slurried in a solvent mixture of heptane/acetone/water in proportions 4:15:1. The slurry was filled under pressure into a teflon tubing, 3 m × 1.5 mm, which was equipped with a filter of porous teflon and a 2 cm length of stainless steel capillary in the lower end. When the Sephadex derivative had formed a bed in the entire teflon tubing the packing was interrupted and a device for the injection of solutions was attached to the upper end of the tubing. The column was connected with a glass vessel containing heptane/acetone/water, 4:15:1, which, by application of pressure was allowed to flow through the bed of the lipophilic-hydrophobic Sephadex derivative with a flow rate of 3 μl/min.

A solution of 10–50 μg each of the cholesterol, cholesteryl acetate, cholesteryl butyrate, cholesteryl valerate, cholesteryl caproate, cholesteryl caprylate, cholesteryl decanoate, cholesteryl palmitate and cholesteryl stearate in 10 μl of chloroform was injected in the upper end of the column. The appearance of these substances in the effluent from the lower end of the column was monitored with a device based on flame ionization detector. The nine compounds appeared separated from each other in the order enumerated above. The maximal concentrations of the respective compounds in the effluent was obtained when 5.30, 5.68, 6.51, 6.86, 7.20, 7.95, 8.88, 11.84 and 13.16 ml, respectively, of the solvent had passed through the column. When these figures are expressed as elution volumes relative to the elution volume of cholesterol the following relationships are obtained:

| | |
|---|---|
| Cholesterol | 1.00 |
| Cholesteryl acetate | 1.08 |
| Cholesteryl butyrate | 1.23 |
| Cholesteryl valerate | 1.29 |
| Cholesteryl caproate | 1.36 |
| Cholesteryl caprylate | 1.50 |
| Cholesteryl decanoate | 1.68 |
| Cholesteryl palmitate | 2.24 |
| Cholesteryl stearate | 2.48 |

In the same way the separation of other lipids was studied and the following relative elution volumes were obtained:

| | |
|---|---|
| Cholesterol | 1.00 |
| Monopalmitin | 0.30 |
| Chimyl alcohol | 0.37 |
| Monostearin | 0.43 |
| Butyl alcohol | 0.45 |
| Dipalmitin | 0.57 |
| Distearin | 0.74 |
| Tripalmitin | 1.41 |
| Tristearin | 1.98 |

These experiments show that in this solvent system a compound is more retarded on the column the less polar it is.

In another experiment a chromatography column (1.77 m × 1.5 mm) was made in a similar way using Nedox 1114 substituted Sephadex LH-20 (degree of substitution: 50 weight percent of hydroxyalkyl chains). Heptane/chloroform, 8:2, was used as the solvent. On this column 10 μl of a solution was injected containing 10-50 μeach of the following steroids: pregn-4-ene-3,20-dione, 20β-hydroxypregn-4-en-3-one, 20α-hydroxypregn-4-en-3-one, 11β-hydroxypregn-4-ene-3,20-dione, 11α-hydroxypregn-4-ene-3,20-dione and 11β,21-dihydroxypregn-4-ene-3,20-dione. These compounds were completely separated from each other on the column and appeared in this order with maximal concentration when 2.30, 3.88, 4.33, 7.68, 9.43 and 22.0 ml, respectively, of solvent had passed through the column.

This experiment shows that with this solvent compounds are more retarded the more polar they are. The experiment also shows the ability of this type of chromatography to separate molecules which differ only with respect to the sterochemistry of the substituents.

I claim as my invention:

1. A solid derivative of a polysaccharide containing more than 6 pentose or hexose groups, said derivative containing at least one radical of the formula

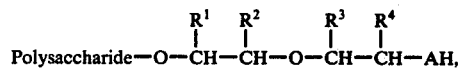

a. wherein said A is sulfur, and
b. said $R^1$ and $R^2$ are each hydrogen alkyl, aryl, alkylene, or alkoxyalkyl, and
c. wherein said $R^3$ and $R^4$ are each hydrogen, alkyl, aryl, alkylene, or alkoxy alkyl,
  i. said $R^1$ and $R^2$ containing not more than 6 carbon atoms,
  ii. said $R^3$ and $R^4$ containing not more than 28 carbon atoms.

2. A solid derivative of a polysaccharide containing more than 6 pentose or hexose groups, said derivative containing at least one radical of the formula

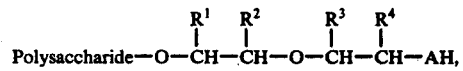

a. wherein said A is oxygen or sulfur, and
b. said $R^1$ and $R^2$ are each hydrogen alkyl, aryl, alkylene, or alkoxyalkyl, and
c. wherein one of said $R^3$ and $R^4$ is hydrogen and the other a halogen substituted alkyl, aryl, alkylene, or alkoxy alkyl,
  i. said $R^1$ and $R^2$ containing not more than 6 carbon atoms,
  ii. said $R^3$ and $R^4$ containing not more than 28 carbon atoms.

3. Polysaccharide of claim 2, wherein the other of said $R^3$ and $R^4$ is a halogen substituted alkyl.

4. Polysaccharide of claim 3, wherein the halogen-substituted radical is chloromethyl or bromomethyl.

* * * * *